Oct. 9, 1951     W. R. WEAVER ET AL     2,570,891
STICK DISPENSING AND POSITIONING APPARATUS
Filed Nov. 8, 1948     5 Sheets-Sheet 1
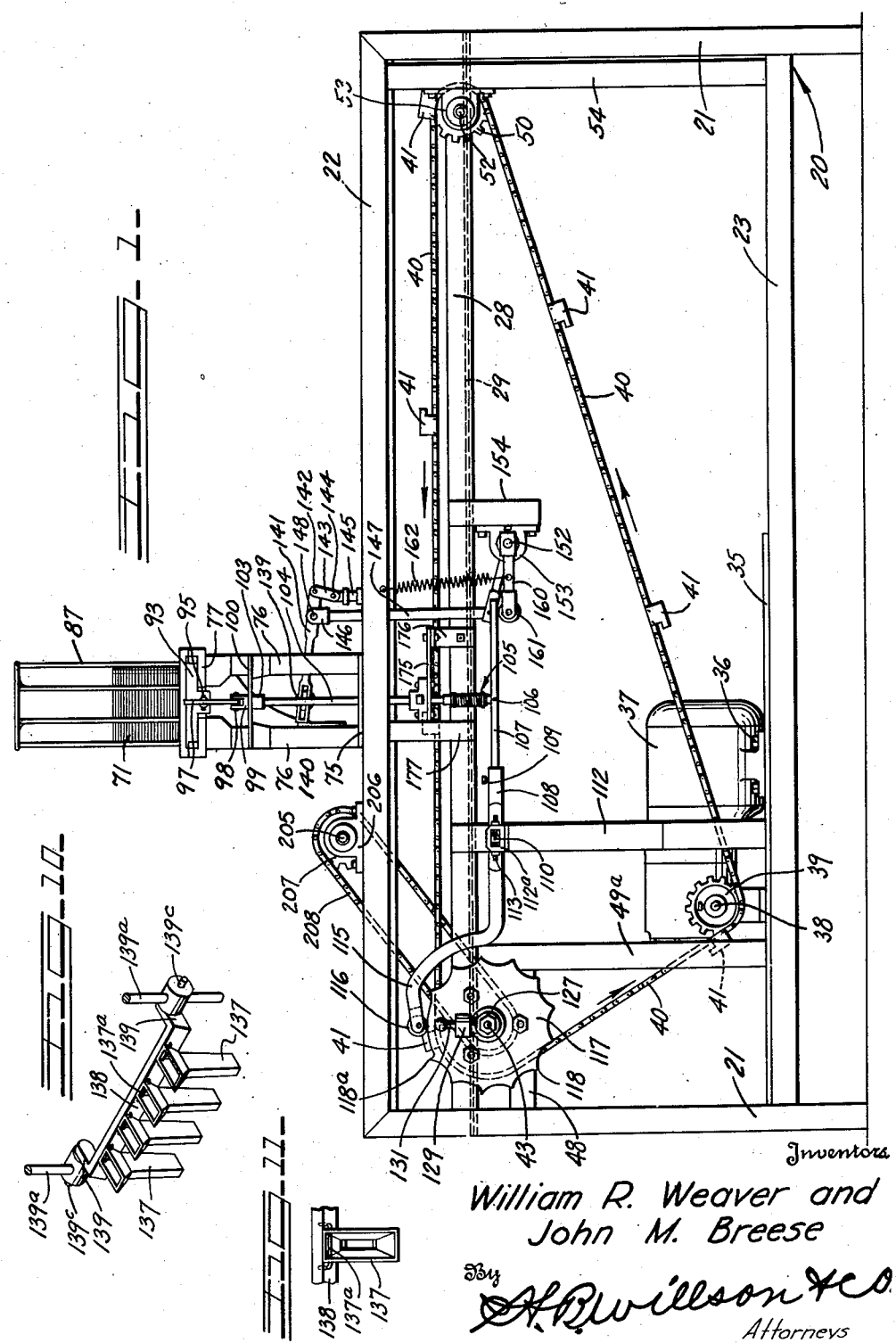
Inventors
William R. Weaver and
John M. Breese
By H. R. Willson & Co.
Attorneys

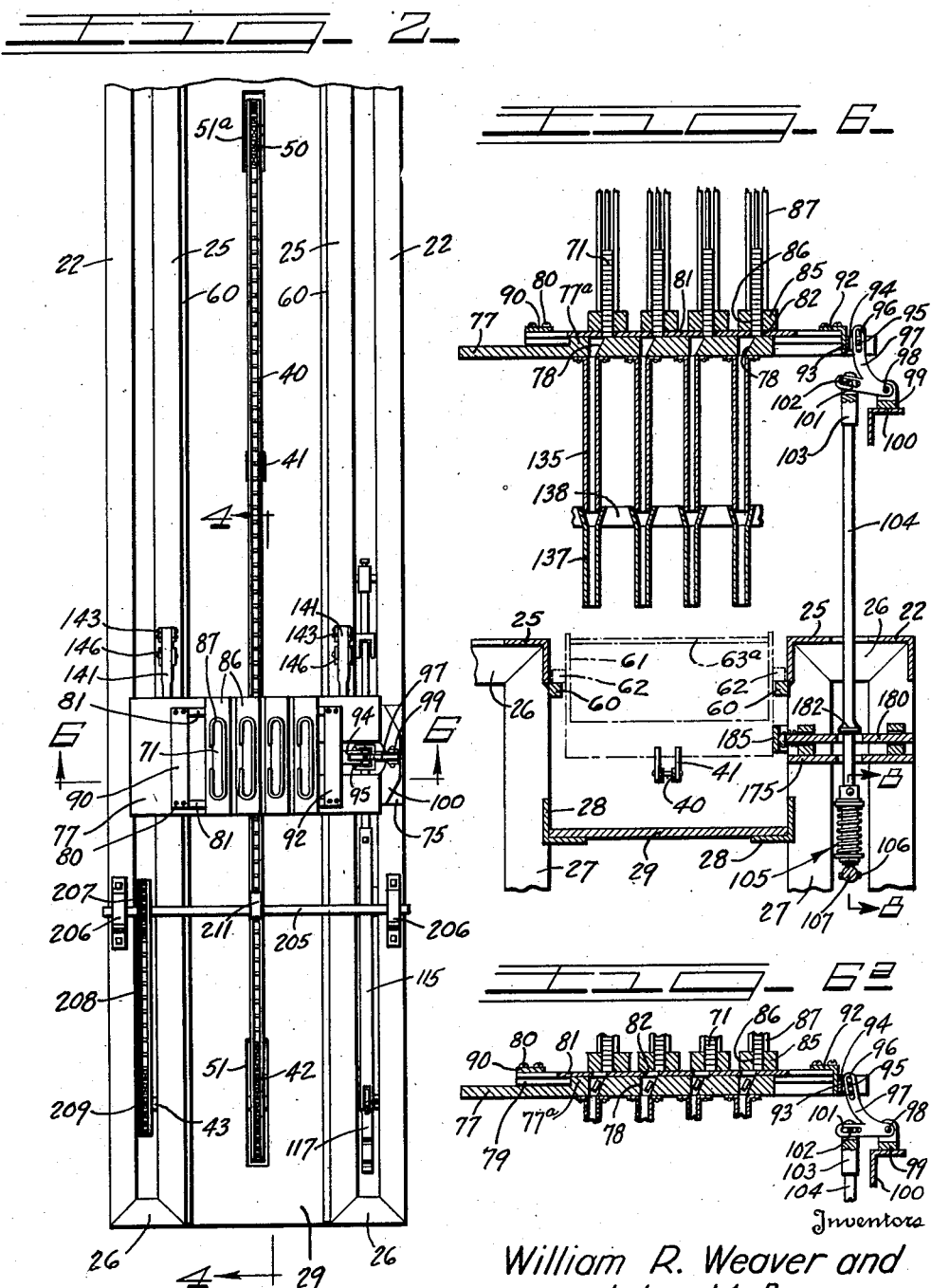

Oct. 9, 1951  W. R. WEAVER ET AL  2,570,891
STICK DISPENSING AND POSITIONING APPARATUS
Filed Nov. 8, 1948  5 Sheets-Sheet 3
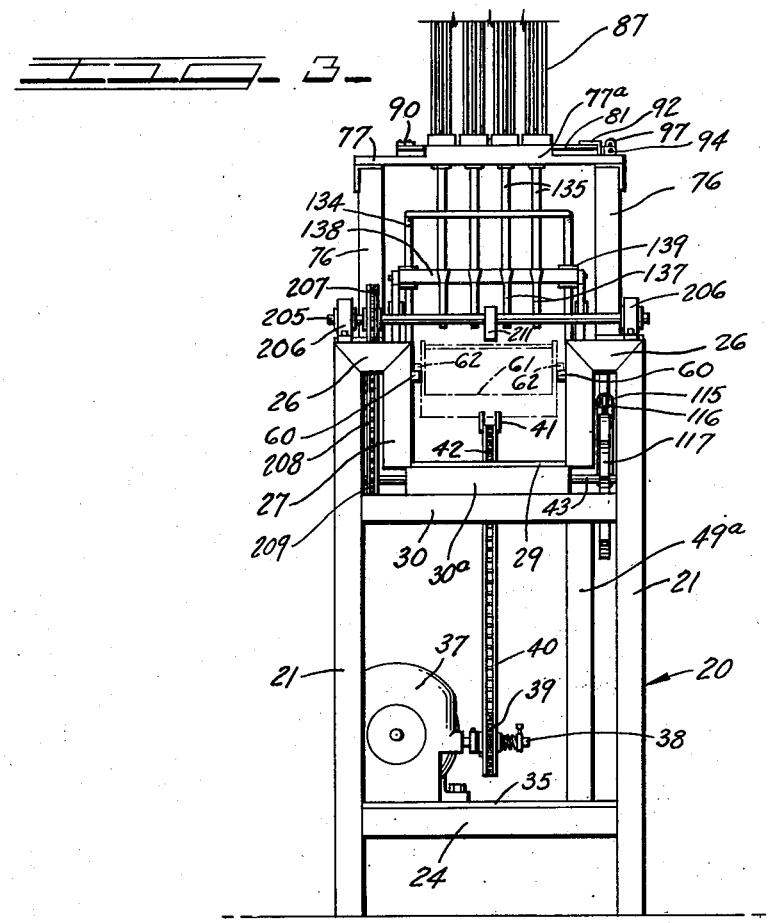
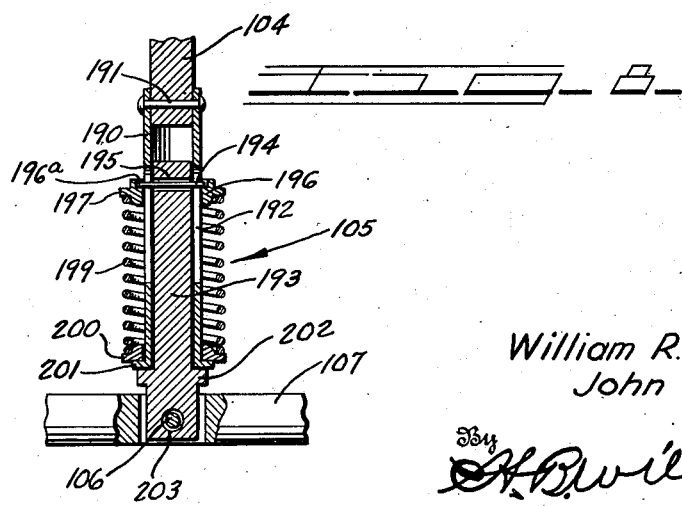
Inventors
William R. Weaver and
John M. Breese
By
Attorneys Oct. 9, 1951     W. R. WEAVER ET AL     2,570,891
STICK DISPENSING AND POSITIONING APPARATUS
Filed Nov. 8, 1948     5 Sheets-Sheet 4
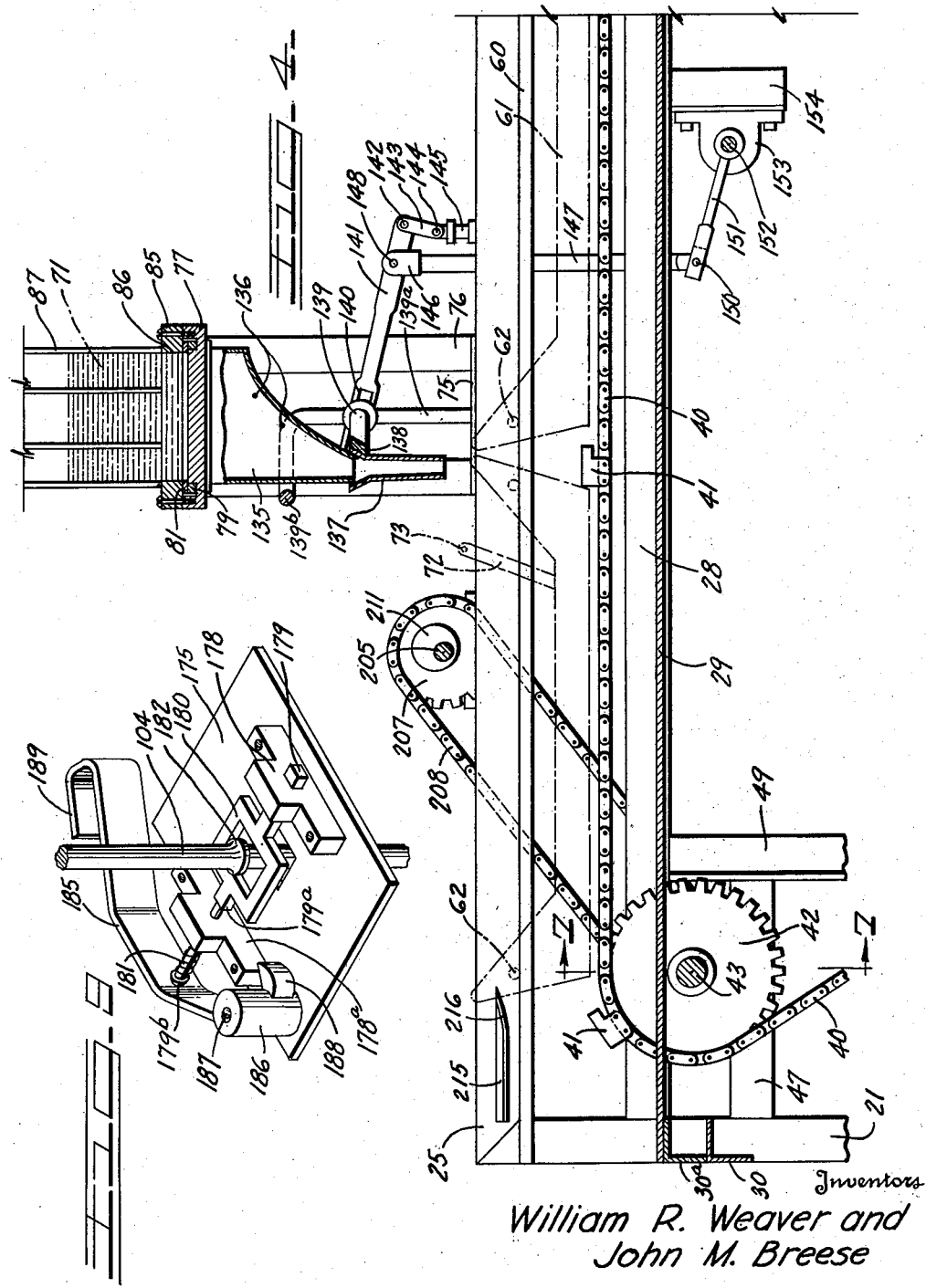
Inventors
William R. Weaver and
John M. Breese
By H. R. Willson & Co.
Attorneys

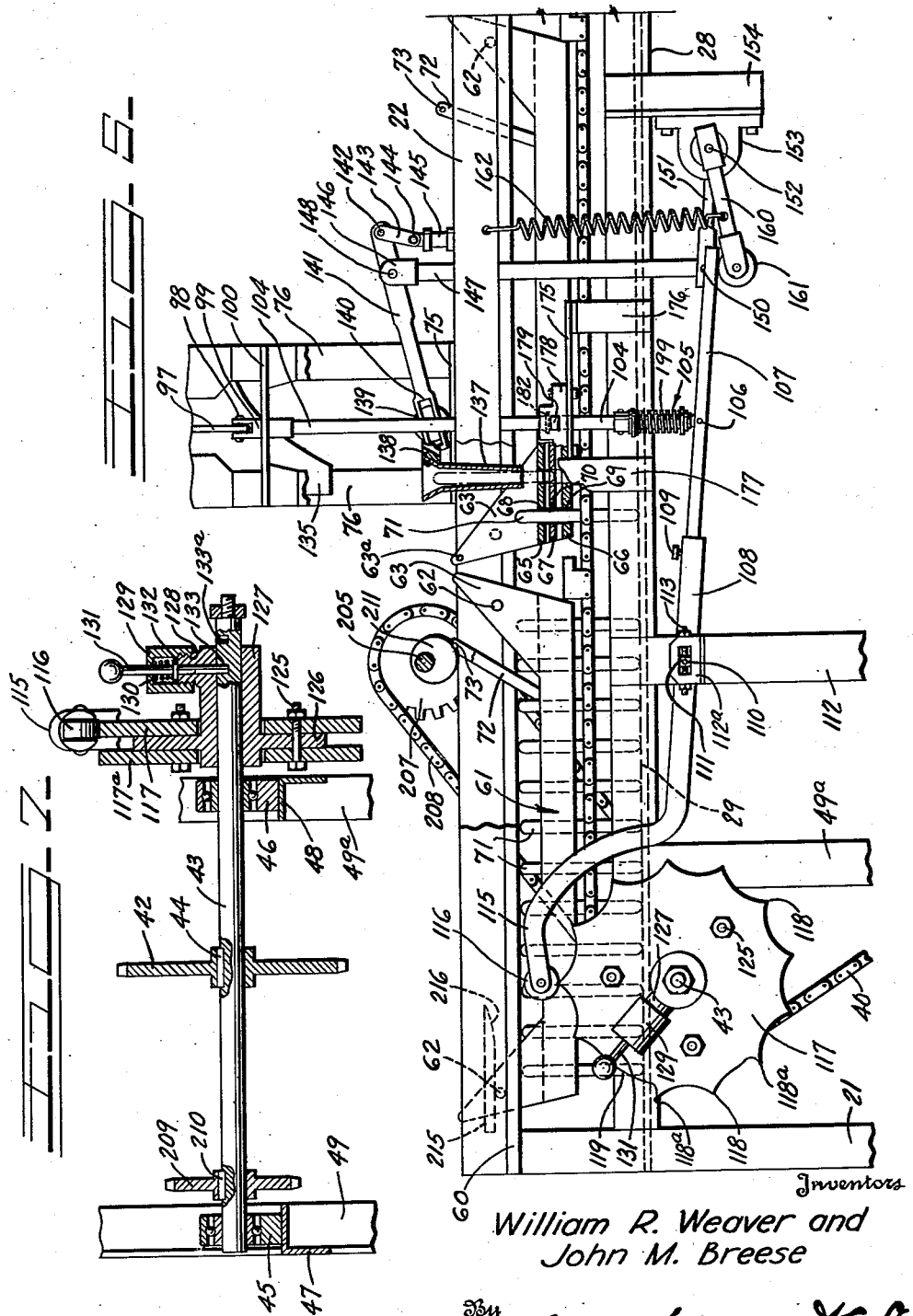

Patented Oct. 9, 1951

2,570,891

UNITED STATES PATENT OFFICE 2,570,891

STICK DISPENSING AND POSITIONING APPARATUS

William R. Weaver and John M. Breese, El Paso, Tex.

Application November 8, 1948, Serial No. 58,968

23 Claims. (Cl. 226—14)

This invention relates to stick dispensing and positioning apparatus, and more particularly to apparatus for positioning handle sticks in a mould top for a subsequent insertion into fluid contained in the compartments of a mould used in making frozen confections.

As conducive to a clearer understanding of this invention it may be pointed out that in the manufacture of confections on stick handles and particularly frozen confections such as "Popsicles," "Good Humors" and others, characterized by a portion of a frozen confection fixed upon a stick or handle, it is customary to pour fluid to be frozen into a plural compartment mould adapted for the simultaneous freezing of a relatively large number of such confections, the number varying in accordance with various types of moulds, to position individual sticks in a tray-like mould top, with a portion of each stick extending below the mould top for insertion into the liquid to be frozen thereon, to lock the sticks in position within the mould top, to position the mould top on the mould and pass the assembly, including the so positioned sticks, to a freezing unit. Various types of mould tops are known in the art, and the herein disclosed embodiment of the instant invention is adapted to be utilized in conjunction with such a known mould top as that disclosed in the patent to H. Siemund No. 2,321,632 issued June 15, 1943. The mould top of this patent is characterized by three parallel vertically spaced plates, the central one of which is longitudinally movable to a limited distance relative to the others. The plates are each provided with a plurality of longitudinal and transverse rows of apertures which, when the central plate is in one position of adjustment are in alignment vertically, that is, the holes in the intermediate plate are aligned with corresponding holes in both the upper and lower plates, to permit the ready insertion of sticks in the mould top. When the intermediate plate is moved to another position of adjustment however the sticks are clamped or locked between the opposed edges of the holes of the upper and lower plates and the holes in the intermediate plate to hold the same securely in vertical position against both vertical and horizontal displacement. Heretofore the positioning of sticks in such mould tops has been largely a manual operation, although applicants are aware that various devices have been proposed for the purpose of mechanical insertion of sticks into mould tops or stick carriers of various types. Such devices or machines so far as known to applicants have not been completely automatic and have had certain drawbacks including non-synchronous operation, the requirement of manual actuation of the stick dispensing means, manual shifting of the mould top to ensure proper spacing and alignment, and manual actuation of the stick locking means on the mould tops.

The primary object of the invention is the provision of a completely automatic machine for loading standard stick holding mould top trays in such manner that the sticks need not be touched by the hand and in which the loading operation is performed rapidly and accurately, thereby saving much labor and time.

Another object of the invention is the provision of a machine of this character in which the transverse rows of stick receiving apertures in a mould top tray are successively filled as the tray is mechanically moved beneath a stick dispenser.

A further object is the provision of a machine in which a line of spaced trays are positively and continuously advanced through the machine by an endless conveyer beneath a stick dispenser having ejector means timed to drop sticks by gravity in the transverse rows of apertures in the advancing trays.

Another object is the provision of means for preventing the operation of the stick ejector means when no tray is positioned beneath the dispenser to receive them.

Another object is the provision of means beneath the ejector to tilt the sticks from a horizontal to a vertical position.

Another object is the provision of movable stick guiding means beneath the dispenser to insure the dropping of the sticks into the apertures in the trays.

Another object is the provision of automatically operating means to actuate the stick locking means on the trays as the latter are filled.

Still other objects are the provision of cam actuated lever means operable to time the stick dispensing operation in synchronism with the passage of the rows of apertures in the trays moving beneath the dispenser, means for selectively positioning a double cam in operative position relatively to the lever which it actuates in accordance with the number of rows of apertures in the trays to be filled, means to insure the uniform positioning of the sticks in the trays, and various adjustments to compensate for wear and to permit keeping the movable parts in properly timed operation.

The invention resides in the combinations of elements, the arrangements of parts, and features of construction, all as will be more fully pointed out hereinafter and shown in the accompanying drawings wherein there is disclosed a preferred embodiment of this invention.

In the drawings:

Fig. 1 is a side elevational view of one form of apparatus embodying features of the instant invention.

Fig. 2 is a top plan view of the construction shown in Fig. 1, portions thereof being broken away.

Fig. 3 is an end elevational view of the apparatus as viewed from the left in Fig. 1.

Fig. 4 is an enlarged sectional view taken substantially along the line 4—4 of Fig. 2 as viewed in the direction indicated by the arrows, certain portions thereof being broken away, and certain apparatus utilized in conjunction with the device being indicated by the dotted lines.

Fig. 5 is an enlarged side view, partially in elevation and partially in section, similar to Fig. 1 but showing certain operative elements in a different position of adjustment, and having certain portions of the apparatus broken away.

Fig. 6 is an enlarged sectional view taken substantially along the lines 6—6 of Fig. 2.

Fig. 6a is a fragmentary view of a portion of the apparatus disclosed in Fig. 6, but showing certain of the parts in a different operative position.

Fig. 7 is an enlarged sectional view taken substantially along the line 7—7 of Fig. 4 as viewed in the direction as indicated by the arrows.

Fig. 8 is an enlarged sectional view taken substantially along the line 8—8 of Fig. 6 as viewed in the direction as indicated by the arrows.

Figs. 9 and 10 are enlarged perspective views of structural features, and

Fig. 11 is a detail view showing the pin connection for the stick guides.

Similar reference characters refer to similar parts throughout the several views of the drawings.

Referring now to the drawings in detail, the numeral 20 indicates generally an elognated rectangular main frame which includes four upright corner posts 21, of angle iron or the like. The upper extremities of each longitudinal pair of posts are connected by longitudinally extending top members 22, and the lower portions of which are connected by longitudinally extending bottom members 23. Between top members 22 are longitudinally extending members 25 horizontally spaced from each other, as seen in Fig. 2, to form between them a slot or passage extending longitudinally of the frame. The members 22 and 25 are connected by short frame members 26 at the extremities thereof. From each member 26 at its inner extremity depends a vertical member 27, to each pair of which is secured a longitudinally extending angle iron member 28, the aligned horizontal flanges of which serve to support a horizontal stick-gauge plate 29 preferably extending longitudinally the length of the frame in order to strengthen it. Transversely extending angle iron members 30, 30a are provided between opposite end posts 21 of the frame for additional support of plate 29.

Longitudinal members 23 and one end member 24 serve as a support for a plate 35, upon which is mounted, in any desired manner as by bolts 36, an electric motor 37 provided with a drive shaft 38 carrying a sprocket 39. The motor is preferably a variable speed motor and as seen in Fig. 3 the sprocket wheel is connected to its shaft by an automatic safety throw-out clutch. The sprocket 39 is adapted to drive an endless conveyer chain 40, provided with a plurality of spaced lugs 41, both the purpose and spacing of which will be more fully described hereinafter. Chain 40 extends upwardly to a sprocket 42, mounted on an axle or shaft 43, and secured thereto by means of a key 44 (see Fig. 7). The shaft 43 is journalled in ball bearings 45 and 46, bearing 45 being mounted on a longitudinally extending member 47 positioned between one end posts 21 and an additional vertical post 49 extending upwardly from motor plate 35 as seen in Fig. 4. Bearing 46 is mounted on a similar member 48 extending to a similar vertical post 49a as seen in Fig. 1. The upper portion of sprocket 42 extends through a suitable slot 51 in plate 29, to carry chain 40 thereabove, and the chain thence extends substantially the length of the passage through the frame and above plate 29 to the upper portion of a sprocket 50 which extends through a second slot 51a in plate 29, and is mounted on a shaft 52. The extremities of shaft 52 are journalled in suitable bearings 53 carried by uprights 54 extending vertically between members 22 and 23 adjacent opposite end posts 21 at the front end of the machine. Rotation of the chain 40 is in the direction of the arrow as indicated in Fig. 1, or longitudinally above the center of plate 29 from the sprocket 50 to the sprocket 42.

The inner depending flanges of the angle members 25 have secured to them longitudinally extending track bars or rails 60, upon which are adapted to ride supporting lugs 62 which extend outwardly from the opposite sides of stick-holding mould top trays 61. Two of these trays which form no part of the instant invention, are conventionally shown in Fig. 5 and reference to said Patent 2,321,632 may be had for the details of construction and operation of them, although said trays as marketed under said patent differ slightly from the drawings of said patent with respect to the proportions and arrangement of some of the parts. To facilitate an understanding of the manner in which such trays are filled and manipulated by the machine, one of the trays in Fig. 5 has parts broken away and in section. These trays include spaced side plates 63 having at their ends opposed upwardly extending triangular portions connected by handle bars 63a. The four supporting lugs 62 project laterally from these portions and slide on tracks 60. Each tray includes two vertically spaced horizontal plates 65 and 66 between which is a similar slidable plate 67. All three plates have a similar arrangement of stick receiving apertures, those in plates 65, 66 being permanently aligned and the sliding movement of plate 67 permits its apertures to be moved into alignment with the others. When the apertures 70 in plate 67 are aligned with the apertures 68 and 69 in plates 65 and 66 respectively, as shown in Fig. 5 a stick handle 71 for a frozen confection may be dropped into three of the aligned apertures until its lower end strikes the gauge plate 29, as shown in Fig. 5. The sticks 71 may be flat or round and the trays are made to hold either 24 or 48 arranged in transverse rows with 4 sticks in each row. When all of the apertures in a tray are filled with sticks, the plate 67 is shifted lengthwise of the tray to bind the sticks and hold them with their lower ends projecting uniformly below the bottom of the mould top tray because they contact with the gauge plate 29. The slidable plate is shifted by the means shown in said patent and such means is actuated by a pair of pivoted upwardly projecting and inclined levers 72, the upper ends of which are rigidly connected by a cross bar 73. Means, to be described, are provided for the actuation of levers 72 after all of the rows of apertures in a tray have been filled with sticks.

From the foregoing operation of the portion of the device so far described should now be readily understandable. When the motor 37 is energized, the chain 40 travels in the direction as indicated by the arrows in Fig. 1, and the mould top trays 61 are so positioned that their lugs 62 rest on flanges or tracks 60, while the ends of the trays are successively engaged by lugs 41 which positively push them along the track in spaced relation. As the trays are moved lengthwise of the apparatus, stick dispensing mechanism, to be described, first positions sticks in the successive rows of apertures in each successive tray, and then mechanism, also to be described, acts on levers 72 of the filled or loaded trays to lock the sticks against displacement. The attendant removes the filled and locked trays as they arrive at the rear end of the machine.

Referring now to the stick dispensing and positioning mechanism in detail, it will be seen that two horizontal plates 75 are secured to longitudinal member 22 on opposite sides of the frame and support on each side a pair of spaced uprights 76 extending a substantial distance above the main frame, the opposite pairs of uprights serving to support a transversely extending horizontal plate 77, provided with a plurality of longitudinally extending tapered slots 78 shown in Fig. 6. These slots are formed in a thickened or raised portion 77a of plate 77 and that portion as shown in Fig. 4 is formed in its top with parallel grooves to slidably receive guide bars 79, longitudinally movable with respect to plate 77 and transversely movable with respect to frame 20. Said guide bars are secured as by screws 80 to a slidable shutter 81 provided with ejector slots 82, adapted to be moved into and out of registry with slots 78. Longitudinally extending blocks 85 are secured, as seen in Fig. 4, transversely of portion 77a of plate 77, and are provided with openings 86 of a size corresponding to a flat side of one of the sticks 71, each opening 86 being normally aligned with an associated slot 82, when the parts are in one position of adjustment, as shown in Fig. 6. Each block 85 has secured to it a vertically extending stick magazine in the form of wire frame 87 so dimensioned as to accommodate a relatively large vertical stack of horizontally positioned sticks, the lowermost of which sticks is normally positioned in a slot 82 of ejector 81. It will now be seen that with the parts in the position as disclosed in Fig. 6 a stick 71 rests in each slot 82, relatively adjacent an associated slot 78, and that, upon movement of the parts to the position disclosed in Fig. 6a each slot 82 will be moved to a position whereby the stick contained therein may drop by gravity into one of the tapered slots 78.

At one end of the ejector 81 is a transversely positioned tie plate 90 secured by the screws 80 to the bars 79. The other end of ejector 81 carries a corresponding plate 92 which has a depending flange 93 to move in a notch at the adjacent end of plate 77. The ends of ejector plate 81 are also notched as seen in Figs. 2 and 6. The depending flange 93 has secured to it a lug 94 carrying a pin 95 engageable in a slot 96 in one arm of a bell-crank lever 97 pivotally mounted as on a pin 98 carried by bracket 99 secured on a bar 100 extending between a pair of uprights 76 rising for one plate 75. The other arm of the bell-crank member 97 is provided with a slot 101 through which extends a pin 102 carried by the bifurcated extremity 103 of a rod 104 which extends downwardly through the space between adjacent members 22 and 25, as seen in Fig. 6. It will now be readily apparent that vertical movement of the rod 104 will be converted to linear movement of ejector plate 81, and that correspondingly as the rod is moved downwardly from the position shown in Fig. 6 to the position shown in Fig. 6a ejector 81 will be moved in the manner previously described to eject a stick 71 into each slot 78.

Having reference now to the means for actuating ejector 81 to discharge sticks into the slots 78 in synchronism with the positioning of stick receiving apertures in the mould tops as they pass beneath the dispensing device, it will be seen that the lower end of rod 104 carries a spring fitting or yieldable connection generally indicated at 105, to be described in detail hereinafter. The lower extremity of fitting 105 as shown in Fig. 8 is pivotally connected as by a pin 106 to one section 107 of a two-section longitudinally adjustable lever 107. One end of lever section 107 is slidably adjustable within a tubular end of the other lever section 108 and is secured therein by means of a set screw 109, thus limited adjustment of the length of the lever 107, 108 being permitted. The lever is mounted for pivotal movement on a pivot 110 carried in an adjustable bearing 111 supported by a bracket 112a secured to a post 112 rising from plate 35. The bearing 111 is slidable in slotted bracket 112a and is adjustable by means of screws or bolts 113 in a well known manner. The rear end of lever section 108 terminates in an arcuate or curved portion 115, which has rotatably mounted at its extremity a roller 116 to coact with a cam 117 fixed on shaft 43.

Referring more particularly to cam 117, it will be seen that it is provided with twelve high points or teeth 118, the contour between adjacent teeth being concave, and the arrangement being such that as each tooth or point 118 engages roller 116 the lever assembly is moved about pivot 110 to move lever section 107 downwardly, and consequently pull rod 104 downwardly in such manner as to actuate ejector plate 81. Conversely when the roller 116 rides in a low or concave portion between points 118, lever 107 is permitted to raise rod 104 to position the ejector as seen in Fig. 6. The raising of the lever 104 is effected by the spring means to be more fully described hereinafter. Ten of the points 118 are provided with relatively gentle approaches, but two designated 118a, and spaced apart by a single point 118 are provided with relatively sharp drops, as shown in Fig. 5, to effect a correspondingly rapid raising of certain mechanism also to be described hereinafter. The cam is formed with a space or dwell 119 characterized by the spacing of one of point 118, and the next point 118a substantially double the distance between any other two adjacent points. The purpose of this dwell will also be pointed out hereinafter. As above stated, twelve points are provided for the filling of twelve transverse rows of stick apertures in each mould top or tray 61, this being a conventional number in certain types of apparatus wherein 48 sticks are carried. In other types of apparatus however only six transverse rows of apertures are provided, it is necessary to use a cam having only six high points thereon. In practice it has been found expedient to mount a six point cam on the same hub with a twelve point cam, and provide relatively simple means for shifting from one cam to the other, in order to accommodate both standard types of trays. Fig. 7 discloses one means of effecting such mounting and shifting, wherein the cam 117 is disclosed as secured by bolts 125 to a flange 126 carried by a hub 127 slidably mounted on shaft 43. A second cam 117a, similar in general configuration to cam 117 but having only six points, is secured by the same bolts to the opposite side of flange 126. Hub 127 carries a threaded boss 128, upon which is screwed a cap 129 containing a spring 130. A pin 131 extends through an aperture at the top of cap 129 and a suitable bore in boss 128, being spring biased, as by the abutment of spring 130 against a collar 132 carried by pin 131, to downward position. Shaft 43 is provided with two spaced sockets 133 and 133a in longitudinal alignment, the arrangement being such that when the pin 131 is seated in socket 133 cam 117 will be juxtaposed to roller 116 for a twelve row tray, while, conversely, when the pin 131 is seated in socket 133a cam 117a will be juxtaposed to roller 116 for actuation of the apparatus in synchronism with six row trays. Obviously the device may be readily shifted from one position to another by retracting pin 131 against the bias of spring 130. It will of course be understood that the cams will vary according to the number of sticks to be placed in the trays to be filled.

Referring back now to the stick dispensing mechanism and particularly to Figs. 4 and 6, it will be seen that positioned beneath each of the tapered slots 78 is a tapered guide sleeve or chute 135, the taper extending in a direction at substantially right angles to the taper of slots 78. The chutes 135 have closely spaced flat side walls disposed in parallel planes which extend lengthwise of the machine. Interiorly of each guide sleeve 135 adjacent its front end are positioned one or more transverse guide pins or abutments 136 so arranged that when a stick 71 falls into the guide chute 135 in substantially horizontal position the pins will serve to tilt or direct the stick to substantially vertical position, to facilitate insertion into the openings of mould tops 61. It will be seen on referring to Fig. 4 that a dropping stick will engage the upper pin 136 adjacent one of its ends and hence the other end of the stick will be tilted downwardly.

Beneath each chute 135 is a movable funnel-shaped, or tube-like stick-guiding member 137, the arrangement being such that sticks falling through chutes 135 fall in a vertical position into the guides 137. Each guide is moved vertically from the position of Fig. 4, in which it is shown in stick receiving position to the position shown in Fig. 5. In the latter a stick is shown as being dropped into the openings in the mould top or tray.

The hollow or tube-like guide members have their upper ends connected by pivot pins 137a to a cross bar 138 having forwardly extending arms 139 with cylindrical enlargements or bosses at their end. As shown in Fig. 10 these bosses have vertical cylindrical bores to receive and slide on vertical cylindrical guide rods 139a rising from the opposite plates 75 and having their upper ends connected by a cross rod 139b offset rearwardly to clear the chutes 135 as seen in Fig. 4. The outer faces of the bosses have outwardly projecting pins 139c movable in slots 140 in the rear ends of longitudinally extending levers 141. It will be seen that as the levers 141 swing, the group of guides 137 will be moved vertically from the stick receiving position shown in Fig. 4 to the position shown in Fig. 5. The pin connection 137a of the guides permit their lower ends to yield rearwardly if struck by the sticks or portions of the tray. The front end of each lever 141 is pivotally connected as by a pivot 142 to a pair of links 143 which in turn are connected as by a pivot 144 to a lug or bracket 145 secured to an adjacent member 25. The bifurcated upper end 146 of a rod 147 is pivotally connected as by a pivot pin 148 to an intermediate portion of each lever 141. The lower end of each rod 147 is pivotally connected as by a pin 150 to the rear extremity of an arm 151. The two arms 151 are fixedly secured to a shaft 152 extending transversely across the main frame and having its end portions journalled in bearings 153 carried by depending members 154 comprising portions of the frame assembly.

Shaft 152, and consequently each arm 151, is adapted to be actuated by means of an arm 160 suitably secured to an extremity of the shaft, and terminating in a roller 161 adapted to be engaged and depressed by the front end of lever 107 when the roller 116 is raised by one of the points of cam 117. These parts serve in turn to depress rod 147 to lower guides 137 to the position shown in Fig. 5 to guide the dropping sticks into the apertures in the tray or mould top. A relatively heavy coil spring 162 having its extremities connected to one of members 22 and an intermediate portion of arm 160 respectively serves to bias the mechanism in such manner as to raise the guides 137 to clear the sticks and tray parts and to keep roller 116 in contact with the cam 117.

It will now be seen that as each tray 61 is passed beneath the dispensing apparatus, the action of cam 117 will serve to lower the guides 137 toward the tray 61 while simultaneously actuating ejector plate 81 to release sticks 71 into the guides. A low portion of the cam surface will then cause raising of the guides to the position indicated in Fig. 4 for the above mentioned purpose. The relatively sharp drop adjacent the points or teeth 118a, as previously mentioned, is adapted to provide relatively rapid rising of guides 137 in order to permit them to clear respectively the transverse bars 73, and the handle portions 63a at proper intervals. In the illustrated embodiment shown in the drawing, there are seven lugs 41 equally spaced along the 210 links of chain 40, and the arrangement is such, and cam 117 so synchronized, that, one complete revolution thereof permits the passage of one tray beneath the stick dispensing mechanism, each tooth actuating the mechanism to fill one transverse row of apertures. The space 119 on the cam is so positioned as to preclude the operation of the dispenser device between succeeding trays. In other words, space 119 is adapted to be engaged by roller 116 at that point of operation at which a lug 41 passes beneath stick guides 137.

It may occasionally happen that an operator will for one reason or another fail to position a mould top tray in advance of each lug, in which event the dispenser would drop sticks when there is no tray in position to receive them. Under such circumstances it is desirable that the dispenser be prevented from operating. Locking mechanism has therefore been provided. Such means may take the form of a plate 175 mounted on supporting members 176 and 177 secured to the frame assembly as seen in Fig. 1. Plate 175 carries a pair of bearing brackets or lugs 178 and 178a through which extend slidably the reduced end portions 179, and 179a of an open rectangular frame or plate 180. The opening in frame 180 which serves as a locking member, is above an opening in plate 175 and through both openings extends the lower portion of rod 104 as seen in Figs. 6 and 9. The end portion 179 is flat faced and passes through a similarly shaped opening in bearing 178 to prevent member 180 from turning. A spring 181 surrounds the other end portion 179a exteriorly of its associated bearing 178a and serves normally to disalign or shift rectangular frame 180 in such a manner that one edge of its opening is positioned under a stop collar 182 formed on rod 104, thus precluding downward movement of the rod 104, and correspondingly precluding actuation of ejector plate 81.

Spring 181 thrusts against a head 179b at the end of portion 179a and said head pushes a swingable lock-actuating arm 185 into the path of movement of the trays 61 passing through the machine. Arm 185 has at one end a hub 186 pivoted at 187 on plate 175, as seen in Fig. 9. The free end of the arm is bent back upon itself to form a detent portion 189 which is engaged and actuated by the side of a tray passing under the dispenser. A stop lug 188 on hub 186 is adapted to engage the bearing 178a to limit swinging of the arm under the action of spring 181. When a tray is passing under the dispensing mechanism, the arm is moved against the tension of the spring and the locking plate 180 is in its inoperative position shown in Fig. 6, so that the stop 182 may pass through the opening in said plate; but when no tray is in position to receive the sticks, spring 181 moves arm 185 inwardly to dispose said locking plate in the path of downward movement of stop collar 182, and hence prevent actuation of the ejector when lever 107 tries to pull it down.

Means are provided to permit the continued oscillatory movement of lever 107 and continued operation of the machine, even though the locking means just described are effective to preclude downward movement of rod 104. The spring fitting 105 previously mentioned comprises, as best shown in Fig. 8, a tube or sleeve 190 secured as by a pin 191 to the lower extremity of rod 104, and provided with vertical slots 192 in the sides thereof. A cylindrical member 193 is positioned within the lower end of the tube and is slidable within limits imposed by a pin 194, which extends through a transverse opening 195 in the stem or member 193. The ends of pin 194 extend outwardly through the slots 192 to seat within an annular flange 196a of a collar slidable on the tube. The collar is also provided with an outwardly projecting flange 197 against which one end of a coil spring 199 is seated. The other end of spring 199 is adapted to seat against a slidable collar 200, held in position by a stop flange 201 at the extremity of tube 190. A collar 202 integral with member 193 serves to preclude undue strain on and consequently the shearing off of pin 194. The lower extremity of member 193 is reduced and disposed in an opening in lever 107. It has a bore 203 through which passes previously described pivot pin 106. Thus a yieldable connection is provided between lever 107 and rod 104 so that lever 107 is free to move upwardly or downwardly when rod 104 is in locked position. When the parts are in unlocked position the resistance of spring 199 is sufficient to cause the assembly to act as a unit and impart the movement of the lever to the rod 104.

Having reference now to the previously mentioned means for clamping the sticks in position in trays 61 by means of lever 72—73, it will be seen that, as best shown in Figs. 1 and 3, a shaft 205 extends transversely of the frame, the extremities thereof being journalled in suitable bearings 206 carried by members 22. The shaft 205 has fixed to it near one end a sprocket 207 adapted to be rotated by means of a chain 208 which latter also engages a sprocket 209 secured as by a key 210 to shaft 43. Shaft 205 carries at a central point a cam or eccentric element 211 which makes one complete rotation with each complete rotation of shaft 43, sprockets 207 and 209 having the same number of teeth. It will thus be seen that eccentric 211 is rotated into its low position showed in Fig. 5 as a cross bar 73 of lever 72 approaches the same; and that, while in its downmost position will bear against cross bar 73 to move lever 72 to its locking position, thus sliding the intermediate plate 67 to clamp the sticks 71 in a filled tray securely in related assembly. Subsequent rotation of cam 211 will permit the clearance of handle bars 63a of the tray. Means are provided to prevent tilting of the tray during the action of cam 211 on the bar 73, and may take the form of guard flanges 215 having tapered extremities 216 and positioned adjacent the ends of and above the tracks or rails 60. The tray lugs 62 pass under the flanges 215 to preclude tilting of the tray.

It is believed that, from the foregoing, the operation of the device should be sufficiently clear as to obviate the necessity for further detailed description. In brief summary it may be stated that in using the apparatus, the magazines 87 are first filled by dropping packaged sticks into them and removing the bands which hold the sticks in packaged form, the motor is started after the cam for the type of tray to be used has been properly positioned, and the trays, in open or unlocked position are placed successively on the rails 60 in advance of each lug 41. As the lugs slide the trays beneath the dispensing device, the mechanism peviously described simultaneously fills all the openings of each transverse row successively. Means, as above set forth, preclude the dropping of sticks in the absense of a tray beneath the dispenser. Upon further forward movement of the filled tray beyond the dispenser, the apparatus for actuating the locking means in the tray to secure the sticks in desired position comes into play. The trays having the sticks locked therein are manually removed from the apparatus and subsequently positioned on the previously filled moulds which may then be carried to a suitable freezing unit.

From the foregoing, it will now be seen that there is herein provided a completely automatic apparatus for the dispensing and positioning of sticks in mould tops or similar stick holders for frozen confections, which effects a material saving in time and labor, which is sturdy and durable in construction, reliable and efficient in operation, relatively simple and inexpensive to manufacture and operate, and which accomplishes all the objects of this invention.

As many embodiments may be made of this inventive concept, and as many modifications may be made in the preferred embodiment hereinbefore shown and described, it is to be understood that all matter herein is to be interpreted merely as illustrative and not in a limiting sense.

What is claimed is:

1. A machine for dispensing and positioning sticks in mold top trays having spaced rows of spaced stick receiving apertures comprising in combination an elongated frame, a stick dispenser supported transversely above said frame and having a row of stick magazines corresponding in number and spacing to the apertures in a row in the tray, ejector means for simultaneously ejecting a stick from each of said magazines, means for supporting and moving positively and continuously a line of spaced trays longitudinally of said frame beneath said dispenser along a path transverse to the line of said magazines, means for guiding the ejected sticks as they drop by gravity from said ejector means, said guiding means including a row of vertically movable guide members to receive and direct the sticks into the apertures of a moving tray, said tray moving means including a power driven endless conveyor for positively moving the line of trays, means operated in timed relation with said conveyor for actuating said stick ejector means each time a row of tray apertures is moving under said stick guiding members, and means for actuating said members in timed relation with the operation of said stick ejector means.

2. A machine for dispensing and positioning sticks in mould top trays having a plurality of transverse rows of stick receiving apertures comprising in combination, an elongated frame, tracks extending lengthwise thereof for supporting and guiding trays, a driven endless conveyer on said frame and having means to engage and move the trays along said tracks, a dispenser supported above said frame and having a transverse row of magazines, said magazines having vertically extending members for holding vertical rows of superimposed, horizontally-positioned sticks, ejector means for ejecting the lowermost stick in each of said magazines, means associated with said dispenser for tilting the ejected sticks to vertical positions, and means for actuating said ejector means in timed relation with the movement of said conveyer to permit the rows of ejected sticks to drop by gravity into rows of apertures in trays being moved by said conveyer.

3. The structure of claim 2 in combination with vertically movable stick guides to receive the ejected sticks from said tilting means and guide them into tray apertures, and means for actuating said guides in timed relation with the movement of said conveyer.

4. The structure of claim 2 in combination with means for preventing the actuation of said ejector means when no tray is beneath said dispenser, said last-mentioned means including a movable member in the path of and actuated by a tray passing beneath the dispenser.

5. The structure of claim 2 in which the apertured trays have means for locking the sticks in the apertures, together with means to actuate a stick locking means on a stick-loaded tray, said actuating means including a rotary member mounted on said frame between the discharge end of the latter and said dispenser.

6. The structure of claim 2 in which said tracks are horizontally spaced and said conveyor is an endless chain with its upper stretch disposed between and below said tracks, said chain having spaced lugs which form said tray engaging means, and in combination with a horizontal stick-gauge plate supported by said frame and extending longitudinally thereof beneath trays being moved by said conveyer lugs, to limit downward movement of the sticks as they drop into apertures of the trays.

7. The structure of claim 2 in combination with a plural-point cam rotated synchronously with said conveyor, a lever coacting with said cam, and means operated by said lever for actuating said ejector means.

8. The structure of claim 2 in combination with a cam and lever mechanism operated in synchronism with said conveyor, means operated by said mechanism for actuating said ejector means, vertically movable stick guides to receive stick from said turning means and guide them into tray apertures, and means operated by said mechanism for actuating said stick guides.

9. The structure of claim 8 in combination with means for preventing the actuation of said ejector means when no tray is positioned beneath said dispenser.

10. In a machine for dispensing and positioning sticks in a mold top tray having spaced rows of spaced stick receiving apertures, the combination of a dispenser having a row of magazines for holding vertical stacks of horizontal-disposed superimposed sticks, stick ejector means associated with said magazines for simultaneously ejecting the lowermost sticks horizontally from the magazines, a plurality of chutes to receive the ejected sticks and turn them to vertical positions, said chutes being alined in a row and spaced from each other in correspondence with the spacing of the apertures in each row in a tray, means for supporting and moving a tray positively and continuously beneath said dispenser to bring the rows of apertures in such tray successively into vertical alinement with said chutes as the tray is being continuously moved, and means operated in timed relation with said tray moving means for actuating said stick ejector means each time a row of tray apertures is moving under said chutes, whereby the groups of sticks successively ejected will drop by gravity through said chutes and will be deposited in successive rows of tray apertures while the tray is in motion.

11. The structure of claim 10 in combination with a row of vertically movable stick guides to receive the sticks from said stick turning chutes and guide them into tray apertures, and means for actuating said stick guides in timed relation with said stick ejector means.

12. The structure of claim 10 in which said tray moving means includes an endless conveyor and in which said actuating means for said stick ejector means includes a rotary cam driven synchronously with said conveyer and having a plurality of points corresponding in number to the number of rows of apertures in a tray, a lever actuated by said cam, and means actuated from said lever for actuating said stick ejector means.

13. The structure of claim 12 in combination with a row of vertically movable stick guides to receive the sticks from said stick turning chutes and guide them into tray apertures, and means actuated from said lever for actuating said stick guides in timed relation with said stick ejector means.

14. The structure of claim 10 in which said tray moving means includes an endless conveyer and in which said actuating means for said stick ejector means includes a cam actuated lever means, the latter comprising a lever carrying a roller and a cam rotated synchronously with said conveyer, said cam having two laterally spaced plural-pointed cam surfaces either of which may be engaged by said roller to actuate said lever, said cam surfaces having different numbers of points according to the numbers of rows of apertures in trays to be loaded by the machine, said cam surfaces and said roller being relatively movable to permit either cam surface to engage said roller.

15. In a machine for dispensing and positioning sticks in mold top trays having spaced rows of spaced stick receiving apertures, the combination of a dispenser having a row of magazines for holding vertical stacks of horizontally-disposed superimposed sticks, stick ejector means associated with said magazines for simultaneously ejecting the lowermost sticks horizontally from the magazines, a plurality of chutes to receive the ejected sticks and turn them to vertical positions, said chutes being alined in a row and spaced from each other in correspondence with the spacing of the apertures in each row in a tray, means for supporting and moving positively and continuously a line of spaced trays beneath said dispenser along a path transverse to the line of said chutes, said last mentioned means including a power driven conveyer, and cam actuated lever means operated in timed relation with said conveyer for actuating said stick ejector means, said cam actuated lever means including a lever operated by a rotary cam, the latter having a plurality of points corresponding in number to the rows of apertures in a tray and also having a dwell corresponding to the spacing between trays in a line of trays, whereby as each successive tray passes under said dispenser said cam will make one revolution and said stick ejector means will be actuated only when a row of tray apertures is passing under said chutes.

16. In a machine for dispensing and positioning sticks in mold top trays having spaced rows of spaced stick receiving apertures, the combination of a dispenser having a row of magazines for holding vertical stacks of horizontally-disposed superimposed sticks, stick ejector means associated with said magazines for simultaneously ejecting the lowermost sticks horizontally from the magazines, a plurality of chutes to receive the ejected sticks and turn them to vertical positions, said chutes being alined in a row and spaced from each other in correspondence with the spacing of the apertures in each row in a tray, means for supporting and moving positively and continuously a line of spaced trays beneath said dispenser along a path transverse to the line of said chutes, said last mentioned means including an endless conveyer to positively move the trays, cam operated lever means operated in timed relation with said conveyer for actuating said stick ejector means only when a row of apertures in a moving tray passes under said row of chutes, the rows of ejected sticks dropping by gravity into the rows of apertures in trays while the latter are being continuously moved by said conveyer.

17. The structure of claim 16 in combination with a row of vertically movable stick guides to receive the sticks from said stick turning chutes and guide them into tray apertures, and means for actuating said stick guides in timed relation with said stick ejector means.

18. The structure of claim 16 in combination with means for preventing actuation of said stick ejector means when no tray is beneath said dispenser in the line of trays being moved by said conveyer, said actuation preventing means including a movable member in the path of and actuated by a tray passing beneath said dispenser.

19. The structure of claim 16 in which the apertured mold top trays have means for locking the sticks in the tray apertures, together with means for operating the stick locking means on a stick-loaded tray after the latter has passed from beneath said dispenser, said operating means including a rotatable member movable in the path of movement of a portion of the stick locking means to actuate the latter to stick locking position.

20. A machine for dispensing and positioning sticks in mold top trays having spaced rows of spaced stick receiving apertures comprising in combination an elongated frame, a stick dispenser supported transversely above said frame and having a row of stick magazines corresponding in number and spacing to the apertures in a row in the tray, ejector means for simultaneously ejecting a stick from each of said magazines, means for supporting and moving positively and continuously a line of spaced trays longitudinally of said frame beneath said dispenser along a path transverse to the line of said magazines, means for guiding the ejected sticks as they drop by gravity from said ejector means, said guiding means including a row of vertically movable guide members to receive and direct the sticks into the apertures of a moving tray, said tray moving means including a power driven endless conveyer for positively moving the line of trays, a rotary cam driven synchronously with said conveyer and having a plurality of points corresponding in number to the number of rows of apertures in a tray, a lever actuated by said cam, means actuated from said lever for actuating said stick ejector means each time a row of tray apertures is moving under said stick guiding members, and means operated from said lever for actuating said stick guiding members in timed relation with the operation of said stick ejector means.

21. The structure of claim 20 in which said lever carries a roller and said cam has two laterally spaced plural-pointed cam surfaces, either of which may be engaged by said roller to actuate said lever, said cam surfaces having different numbers of points according to the numbers of rows of apertures in trays to be loaded by the machine, said cam surfaces and said roller being relatively movable to permit either cam surface to engage said roller.

22. The structure of claim 20 in combination with means for preventing actuation of said stick ejector means when no tray is beneath said dispenser in the line of trays being moved by said conveyer, said actuation preventing means including a movable member in the path of and actuated by a tray passing beneath said dispenser.

23. The structure of claim 20 in which the apertured mold top trays have means for locking the sticks in the tray apertures, together with means for operating the stick locking means on a stick-loading tray after the latter has passed from beneath said dispenser, said last mentioned operating means including a rotatable member movable in the path of movement of a portion of the stick locking means to actuate the latter to stick locking position.

WILLIAM R. WEAVER.
JOHN M. BREESE.

REFERENCES CITED

The following references are of record in the file of this patent:

UNITED STATES PATENTS

| Number | Name | Date |
|---|---|---|
| 859,772 | Hoyt | July 9, 1907 |
| 1,090,855 | Jagenberg | Mar. 24, 1914 |
| 1,485,099 | Wahl | Feb. 26, 1924 |
| 2,136,901 | Ferguson | Nov. 15, 1938 |
| 2,251,333 | Griffin et al. | Aug. 5, 1941 |